United States Patent [19]
Fritz

[11] Patent Number: 4,784,835
[45] Date of Patent: Nov. 15, 1988

[54] UNIT FOR FILTRATION AND NEUTRALIZATION OF SULFUROUS ANHYDRIDE CONTAINED IN SMOKE FROM A BOILER

[76] Inventor: Patrice Fritz, 11c rue d'Altenheim, 67100 Strasbourg, France

[21] Appl. No.: 873,966

[22] Filed: Jun. 13, 1986

[30] Foreign Application Priority Data

Jun. 13, 1985 [FR] France ............................... 85 09117

[51] Int. Cl.⁴ ............................................ B01D 50/00
[52] U.S. Cl. ................................... 422/170; 422/172; 422/173; 422/110; 55/135; 55/258; 55/257.7
[58] Field of Search ............... 422/170, 172, 173, 110; 55/118, 120, 122, 135, 222, 228, 233, 234, 242, 257 HE, 258, 269; 110/215; 160/140

[56] References Cited

U.S. PATENT DOCUMENTS

| | | | |
|---|---|---|---|
| 2,197,004 | 4/1940 | Myers | 55/242 |
| 2,387,473 | 10/1945 | Spitzka | 55/242 |
| 2,803,439 | 8/1957 | Fikenscher | 165/140 |
| 3,299,620 | 1/1967 | Hollingworth | 55/258 |
| 3,522,000 | 7/1970 | Kinney | 55/242 |
| 3,593,496 | 7/1971 | Merrill | 55/257 HE |
| 3,800,505 | 4/1974 | Tarves, Jr. | 55/222 |
| 3,839,849 | 10/1974 | Maniya | 55/228 |
| 3,854,300 | 12/1974 | Gerhold | 55/84 |
| 3,907,523 | 9/1975 | Melin, Jr. | 422/170 |
| 3,925,040 | 12/1975 | Fattinger | 55/84 |
| 3,963,416 | 6/1976 | Mach | 55/269 |
| 4,021,194 | 5/1977 | Weislehner | 55/269 |
| 4,081,255 | 3/1978 | Evans | 55/242 |
| 4,121,541 | 10/1978 | Kneissl et al. | 55/222 |
| 4,222,748 | 9/1980 | Argo et al. | 55/242 |

FOREIGN PATENT DOCUMENTS 2752833 6/1979 Fed. Rep. of Germany ...... 422/172

*Primary Examiner*—Benoit Castel
*Attorney, Agent, or Firm*—Schwartz & Weinrieb

[57] ABSTRACT

An apparatus for filtration of particles and neutralization of sulfurous anhydride for smoke and gases discharged by a boiler includes a scrubbing train, which in turn includes a heat recovery device that receives on an inlet thereof, the smoke and gases, and lowers the temperature thereof by a heat exchanger to cool the same to a temperature within the range of 10°-25° C.; a prefiltration assembly which receives the cooled smoke and gases from the heat recovery device and removes solids therefrom; a desulfurization chamber which receives the gases and any remaining smoke from the prefiltration assembly, and by a neutralizing device removes sulfur therefrom, the desulfurization chamber delivering a resultant desulfurzed flow to a final stage condensation chamber, the final stage condensation chamber operating through a condenser to dehumidify the desulfurized flow; and an extraction turbine receiving the dehumidified flow for being operated therewith prior to discharge of the flow from an outlet of the apparatus by the extraction turbine.

4 Claims, 2 Drawing Sheets

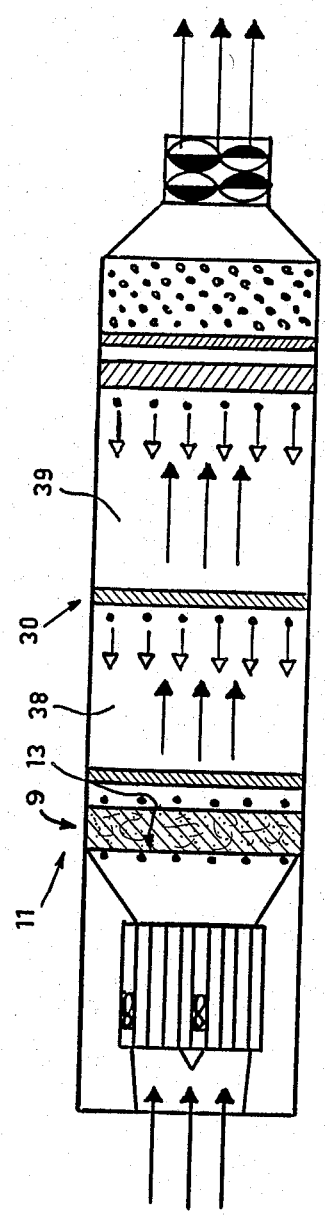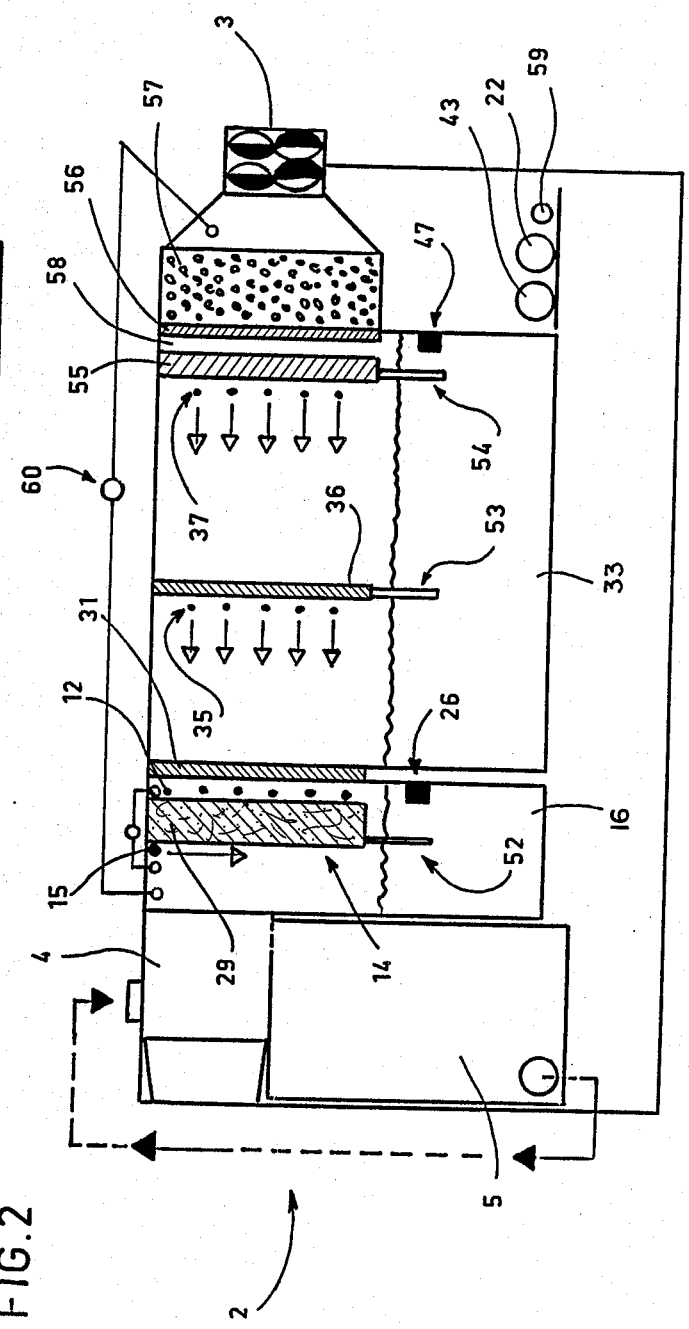

UNIT FOR FILTRATION AND NEUTRALIZATION OF SULFUROUS ANHYDRIDE CONTAINED IN SMOKE FROM A BOILER

BACKGROUND OF THE INVENTION

The present invention relates to a unit for filtration of particles and neutralization of sulfurous anhydride contained in smoke emitted by a central domestic boiler or an industrial boiler.

SUMMARY OF THE INVENTION

The present invention particularly relates to such a unit for treating sulfurous anhydride at ambient temperature.

The main sources of air pollution and their relative importance are not known. Individual, central, or industrial boilers are responsible for a great proportion of emanations of volatile pollutant substances into the air, particularly those such as sulfurous, nitrous, anhydride, carbon oxide, carbon-derived gases and their compounds.

The object of the present invention is to obviate or at least to greatly diminish particle pollution, and, over and above that, to diminish the quantity of sulfurous anhydride emitted by domestic, central or industrial boilers.

For safety reasons, the unit, according to the invention is designed to be placed in a boiler room, above the smoke discharge conduit, by combination with an appropriate heat recovery device, to allow sufficient lowering of the temperature of the smoke.

Besides, for efficiency and greater yield, the scrubbing and filtration treatments must be carried out at low temperature in relation to the smoke temperature, in other words at normal ambient temperature of the rooms of the facility.

The object of the invention is to combine the main conditions of efficiency, and to propose a unit for filtration, scrubbing and desulfurization of smoke from a boiler, which operates at an exceptionally high degree of efficiency.

The scrubbing unit is composed of a heat exchanger-collector allowing the smoke temperature to be lowered nearly to ambient temperature, and a filtration unit with an electrostatic effect, a desulfurization chamber, a dehumidifier, and an active carbon filter, as well as a turbine for acceleration of the flow of the gas which is being discharged.

The process consists of lowering of the temperature of the smoke by recovery of calorific energy by use of a heat exchanger until temperature of the order of 10–25 degrees C. are reached, filtering the smoke, subjecting the smoke to a double counter-current, rinsing by two sequential fluxes of a spray of a neutralizing solution for the sulfurous anhydride, separating the droplets, and dehumidifying and refiltrating operations to retain the remaining quantity of sulfurous anhydride and other pollutant gas residues in an active carbon filter.

The main advantage of the invention, first of all, concerns its high degree of effectiveness in neutralizing the sulfurous anhydride, the main cause of pollution.

It also has the following complementary advantages:
energy savings of approximately 25%;
simultaneous recovery and scrubbing;
production of hot or cold air;
absence of any condensation in the chimney due to the integrated dehydrator;
modification of neither the boiler nor of the chimney;
speed of installation by module;
entirely automatic operation;
no limitation on the smoke discharge temperature.

BRIEF DESCRIPTION OF THE DRAWINGS

The technical features and other advantages of the invention are illustrated in the following drawing, shown as nonlimiting example of a basic embodiment of the invention, in which:

FIG. 1 is a horizontal cross-section of the unit, according to the invention;

FIG. 2 is a vertical cross-section of the unit, according to the invention; and

DESCRIPTION OF THE PREFERRED EMBODIMENTS

Figure 3:
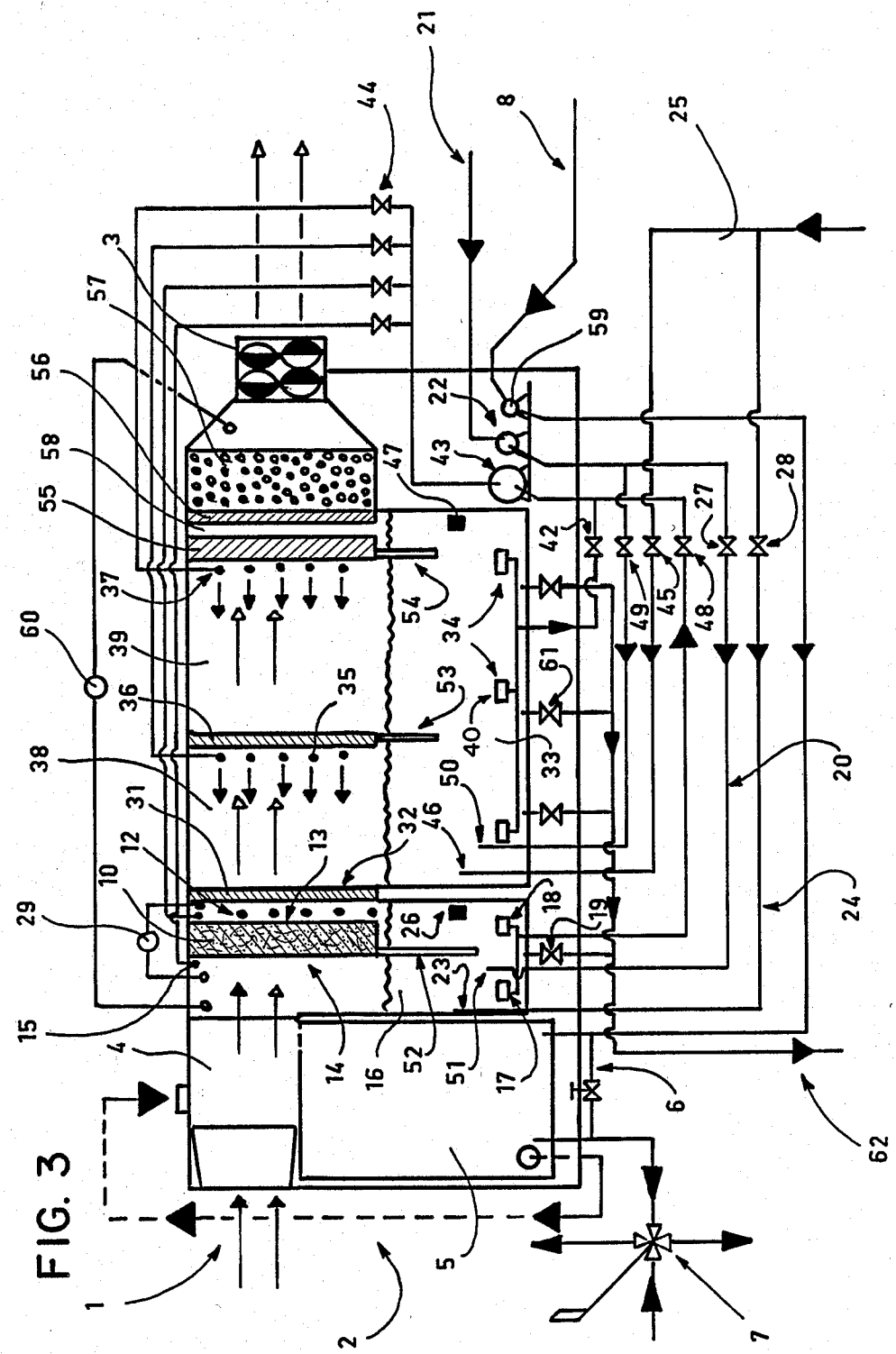
FIG. 3 is a diagrammatic vertical cross-section of a view showing the complete unit with its hydraulic circuit.

The device, according to the invention, will be examined by following the passage of the smoke from its discharge from the boiler to its entrance into the chimney.

The sulfurous anhydride filtration and neutralization device according to the invention, forms a modular box 1, which is preferably placed horizontally, to be used, for example, horizontally in the boiler room in the vicinity of the boiler, between the smoke discharge and the chimney. It is composed of, and contains a plurality of functional units placed in series along the horizontal smoke passage.

At the ends of the device, according to the invention, on the boiler side, there is provided a heat recovery device 2, receiving on a gas inlet thereof smoke from the discharge of the boiler, and on the other side, i.e. a gas outlet thereof, a double extraction turbine 3, which is provided to increase the flow of the smoke along the device and, at the outlet, to regain the same gas flow conditions as at the discharge from the boiler.

Heat recovery device 2 is integrated into the unit, according to the invention, because it realizes the first phase of the process, which is the sufficient lowering of the temperature of the smoke to an ambient temperature, 10–25 degrees C., at which the effectiveness of desulfurization is optimum.

Heat recovery device 2 is preferably of the mixed air/air plus air/water type, in two stages, of which the first would be for example an air/air heat exchanger 4 with discharge plates communicating with an assembly or battery of pipes, for example copper pipes of an air/water heat exchanger 5.

A hydraulic circuit 6 thereof is connected through radiators to the heating circuit, and more generally through heating members across a mixing valve 7, for example simply by placement of the heating members in sequence in the return circuit 8. The advantage of this arrangement resides in the cleanliness of the battery exchanger. In fact, a clean air flow passes over the battery, because it is heated in contact with the plates of the secondary circuit of air/air exchanger 4 and, consequently, cannot be fouled or clogged by the smoke particles.

According to the conditions of use, the air being discharged from the double heat exchanger can be used for heating, by being blown into rooms, or it can be recycled, as is shown by the loop in the drawings.

The smoke being discharged from the air exchanger 4 enters into a prefilteration unit 9, best seen in FIG. 1, and is formed of an electrostatic prefilter 10 of the non-flammable type and is regenerable in glass fiber threads.

This filter will retain the largest solid particles carried by, or contained in the smoke (unburnt residue, soot, and the like.)

It is a highly effective first filtration down to a granular size of three microns, and quite effective down to one micron, but the power of retention in the filter diminishes thereafter.

This prefilter is provided with the cleaning device 11 in the form of one or more spray distributors 12, which project jets horizontally on the entire downstream surface 13 of the prefilter. The water pressure allows the retained particles to pass through the prefilter, and to appear on the upstream side of the filtration unit 14.

The upstream side of the filtration unit 14 may be washed by a top distributor 15 with vertical jets to completely clean the filter. The particles trickle into the recovery hopper 16, where they are pumped through two strainers 17 and 18 for recycling, and the evacuation takes place through the drain, directly through the bottom, across an electrovalve 19.

A solution which neutralizes the sulfurous anhydride, such as for example soda water, cleans the upstream side of the filtration unit 14. Recovery hopper 16 is therefore fed soda water through a conduit 20 connected to the soda water system 21 through a distribution pump 22. The concentration of soda water is adjustable within the hopper 16 by a similar injection 23 of pure water through a conduit 24 attached to a distribution unit 25, which in turn is connected to the primary water supply.

The soda water concentration can be adjusted by an electronic acidity indicator 26, indicating the hydrogen potential of the water to an appropriate regulation circuit acting on the electrovalves 27 and 28 for admission of soda water and pure water.

The cleaning phases of prefilter 10 take place when the burner is shut off, as indicated by a monitoring circuit.

Additionally, a differential controller of prefilter 10 is connected to its input, and the output furnishes to a central control unit the information relating to the degree of clogging which in turn triggers a cleaning phase between two periods of burner operation.

It should be observed, that in the case of continuously burning boilers, coal boilers, wood boilers, wood chips boilers and the like, that the smoke passes continuously over the prefilter. In this case, the unit, according to the invention, will include a prefiltration chamber with two separate compartments, each holding one prefilter. The two prefilters are then placed in service alternately by virtue of a smoke orientation device, for example using powered flaps, controlled by the prefilter differential pressure controllers. One filter will thus be cleaned, while the other will be in service and vice versa.

The smoke then penetrates into a desulfurization chamber 30, best shown in FIG. 1, then passes over an electrostatic filter 31 with high particle retention, 100% effective for particles of three microns diameter, and 90% effective for particles of one micron diameter.

This filter also retains the majority of the remaining particles. It may be composed of a dry plastic medium with a high degree of polymerization, retaining a great proportion of fine particles.

The downstream end 32 of filter 31 is rinsed continuously with a counter-current by a moist flux of neutralizing means, such as a neutralizing solution which neutralizes the sulfurous anhydride, for example soda water obtained from a recovery hopper 33 forming the bottom of the spray chamber. This solution is drawn into hopper 33 over a set of uniformly distributed strainers 34 and projected in a counter-current against the downstream end 32 of filter 31 by a plurality of stepped spray distributors 35, which are equipped with atomizers with square jets. The jets form an active micro-fog of very fine droplets, which propagate in a counter-current. In the course of their passage, the fine droplets react with, and neutralize the sulfurous anhydride, forming sodium sulfate or some other salt, according to the neutralizing solution which is used.

The cleaning of this filter obviates the need for periodic maintenance. The sprayed-on neutralizing solution trickles along the filter to recovery hopper 33 of desulfurization chamber 30. This last-named chamber is followed by a center electrostatic filter 36 of the same type as filter 31.

The downstream side of the latter is also rinsed in the same manner by a plurality of spray distributors 37. This arrangement allows the interior space of the desulfurization chamber 30 to be divided into two spray compartments, respectively, namely compartments 38 and 39.

Soda water recovery hopper 33 includes a recycling circuit 40 operating below atmospheric pressure over the group of strainers 34, an electrovalve 42, and then a main pump 43, best seen in FIG. 2, and a group of electrovalves 44 oriented toward spray distributors 35 and 37, and toward the cleaning device 11 of prefilter 10.

Recovery hopper 33 is fed pure water from the main water supply through an electrovalve 45 and an injection conduit 46. The same soda water concentration regulation device is provided and is dependent in operation upon the electronic acidity indicator 47, best seen in FIG. 2, which in turn is connected with the recovery hopper 33.

The same is true for the recovery hopper 16, which is connected to pump 43 through strainers 17 and 18 and the electrovalve 48.

The soda water or the neutralizing solution passes from an outside reservoir over distribution pump 22, and is admitted into recovery hoppers 16 and 33 over electrovalves 27 and 49 as far as the injection conduits 50 and 51.

The second series of soda water spray distributors 37 moreover allows neutralization of the minute solid particles having dimensions smaller than one micron.

The electrostatic filters 10, 31 and 36 extend vertically toward the corresponding recovery hopper by means of partitions 52, 53 and 54, best seen in FIG. 2, to avoid the passage of smoke between the bottom of the filters and the liquid level in each hopper.

A supplementary electrostatic filter 55, best seen in FIG. 2, acts as separator of droplets to retain most of the volume of humidity contained in the smoke, which is being treated.

A last and similar type of electrostatic filter 56 plays the role of prefilter for an active carbon filter 57, which has a high retention for sulfurous gas and other pollutant gas residues before these pass into the extraction turbine.

As a variant, and if needed, the invention provides optionally for the interposition of a dehumidifier or a condensation chamber 38 between the two other electrostatic filters 55 and 56 or between the last electrostatic filter 56 and the active carbon filter 57.

The dehumidifier 58 includes condensation means, such as a cold direct delay assembly or battery of pipes of the type used in refrigeration circuits or a conventional condensation element.

A supplementary circulator 59, best seen in FIG. 1, mounted on return circuit 8 of the heating members, compensates for any losses of charge over water exchanger battery 5, for good hydraulic function of the heating installation.

To obtain a condition of good gas flow, in particular to regain the same drawing pressure of the smoke as at the discharge from the boiler, the power of turbine 3 is controlled from information furnished by a general differential pressure controller 60, mounted between the inlet of the prefilter 10 and the discharge of the active carbon filter 57.

The evacuation by draining of hoppers 16 and 33 is realized at the bottom, respectively, through electrovalve 19 and a group of electrovalves 61 connected with a common evacuation conduit 62.

The general operation of the unit, according to the invention, is coordinated by a central program, which principally controls the sequences of the cleaning of prefilter 10, while the burner is cold and controls the regulation of the concentration of the neutralizing solution.

The process implemented by the unit, according to the invention, consists of lowering the smoke temperature to be equal to or near ambient temperature, i.e. to approximately 10-25 degrees C., and removing the majority of the particles from the smoke by passage into a prefilter rinsed by a neutralizing solution for the sulfurous anhydride, passing the smoke into a treatment chamber, which includes two end electrostatic filters, and one center filter defining two successive compartments, a chamber in which a counter-current is formed, and two successive spray clouds of a neutralizing solution which neutralizes the sulfurous anhydride. The solution, in regulated concentration of the order of 30%, is sprayed horizontally over the compartments between the two electrostatic filters against the downstream side of the first filters, and is recovered in a lower hopper to be recycled. The smoke then passes over a set of two electrostatic filters separated by a dehumidifier, then passes an active carbon filter, and is finally accelerated before being evacuated through the chimney.

As an example, described hereinafter, several products will be named in addition to the soda water, having a similar neutralizing activity relative to sulfurous anhydride, and which can thus be used in this invention. These are principally a solution of potassium, but also alcohol, acetone, very fine zinc powder in suspension in water, a product known by the name cocoanut of charcoal, or iodine in oxidation reaction.

The invention has been described relative to one particular embodiment. Of course it is in no way limited, and on the contrary, various simple modifications and noninventive changes such as substitutions by equivalent means or materials, or addition of neutral elements, are totally within its scope.

I claim:

1. Apparatus for filtration of particles and neutralization of sulfurous anhydride for smoke and gases discharged by a boiler, comprising in combination
   a scrubbing train including a heat recovery device that receives on an inlet thereof smoke and gases, and lowers the temperature thereof by heat exchanger means to cool the same to a temperature within the range of 10°C.-25° C.;
   a prefiltration assembly which receives cooled smoke and gases from said heat recovery device and removes solids therefrom;
   a desulfurization chamber which receives gases and any remaining smoke from said prefiltration assembly, and by neutralizing means removes sulfur therefrom, said desulfurization chamber delivering a resultant desulfurized flow to
   a final stage condensation chamber, said final stage condensation chamber operating through condensation means to dehumidify the desulfurized flow;
   an extraction turbine receiving the dehumidified flow for being operated therewith prior to discharge of said flow from an outlet of said apparatus by said extraction turbine,
   communication flow means interconnecting said scrubbing train, said prefiltration assembly, said desulfurization chamber, said final stage condensation chamber, and said extraction turbine,
   wherein said scrubbing train, said prefiltration assembly, said desulfurization chamber, said final stage condensation chamber, and said extraction turbine are formed and being contained in a modular box,
   wherein said prefiltration assembly receiving cooled smoke and gases from said heat recovery device comprises two recovery hoppers, an electrostatic prefilter that is nonflammable and of a regenerable type, and includes a cleaning device having a plurality of spray distributors positioned with respect to said prefiltration assembly so that said distributors project jets of a neutralizing solution horizontally toward a downstream end of the prefiltration assembly to neutralize the sulfurous anhydride, said cleaning device also comprising, at a front thereof, an upper distributor having vertical jets allowing complete cleaning of said front, one of said recovery hoppers forming a downstream end of said prefiltration assembly being fed with pure water and a neutralizing solution, said neutralizing solution being selected from the group consisting of soda water, solution of potassium, alcohol, acetone, very fine zinc powder in suspension of water, cocoanut of charcoal, and iodine in oxidation, said upper distributor communicating with the cleaning device through a recycling circuit,
   wherein said desulfurization chamber receiving gases and remaining smoke from said prefiltration assembly is composed of two spray compartments bounded by two end electrostatic filters, and one center electrostatic filter, said filters having a particle retention which is 100% effective for particles of 3 micron diameter, and 90% effective for particles of one micron diameter, each spray compartment being traversed by a counter-current of a spray cloud of micro-fog of said neutralizing solution which neutralizes the sulfurous anhydride, said spray cloud being generated in a counter-current by said spray distributors being positioned near respective opposite sides of said end filters, the desulfurization chamber extending downwardly through another of said recovery hoppers and being in communication with the spray distributors through said recycling circuit, wherein each recovery hopper of said prefiltration assembly includes an acidity indicator associated with a separate regulation circuit acting on a pure water inlet, and on a neutralizing solution inlet communicating with each of said hoppers, wherein said final stage condensation chamber receiving said desulfurized flow from said desulfurization chamber includes an electrostatic filter, and an active carbon filter, said electrostatic filter being a prefilter for said active carbon filter, said active carbon filter having a high retention for gas residues before the latter pass into the atmosphere.

2. Apparatus according to claim 1, wherein said heat recovery device of said scrubbing train has two sequential stages including a first stage, which is an air/air recovery device, and a second stage, which is an air/water recovery device, the latter being mounted in a hydraulic heating circuit.

3. Apparatus according to claim 1, wherein said heat recovery device of said scrubbing train is formed as a closed air circuit.

4. Apparatus according to claim 1, wherein said prefiltration assembly includes two alternately operating filters placed in service by a smoke orientation device including powered flaps, whereby one of said filters can be cleaned, while the other of said filters is operating.

* * * * *